United States Patent
Ma et al.

(10) Patent No.: US 10,380,796 B2
(45) Date of Patent: Aug. 13, 2019

(54) METHODS AND SYSTEMS FOR 3D CONTOUR RECOGNITION AND 3D MESH GENERATION

(71) Applicant: uSens, Inc., San Jose, CA (US)

(72) Inventors: Gengyu Ma, Beijing (CN); Yuan Wang, San Jose, CA (US); Yue Fei, San Jose, CA (US)

(73) Assignee: uSens, Inc., San Jose, CA (US)

( * ) Notice: Subject to any disclaimer, the term of this patent is extended or adjusted under 35 U.S.C. 154(b) by 0 days.

(21) Appl. No.: 15/649,699

(22) Filed: Jul. 14, 2017

(65) Prior Publication Data

US 2018/0025540 A1 Jan. 25, 2018

Related U.S. Application Data

(60) Provisional application No. 62/364,195, filed on Jul. 19, 2016.

(51) Int. Cl.
*G06T 17/20* (2006.01)
*G06T 15/04* (2011.01)
*G06T 7/593* (2017.01)

(52) U.S. Cl.
CPC .............. *G06T 17/20* (2013.01); *G06T 7/593* (2017.01); *G06T 15/04* (2013.01); *G06T 2207/10012* (2013.01); *G06T 2207/30196* (2013.01); *G06T 2215/16* (2013.01)

(58) Field of Classification Search
CPC ......... G06T 19/00; G06T 17/20; G06T 17/00; G06T 15/10; G06T 15/00; G06T 15/20; G06F 3/0483
See application file for complete search history.

(56) References Cited

U.S. PATENT DOCUMENTS 5,819,070 A * 10/1998 Sasaki ..................... G06T 17/20
703/13
5,867,593 A * 2/1999 Fukuda .............. G06K 9/00456
358/462
6,480,622 B1 * 11/2002 Kim ......................... H04N 1/58
358/452

(Continued)

FOREIGN PATENT DOCUMENTS

JP 2016004331 A * 1/2016

*Primary Examiner* — Todd Buttram
(74) *Attorney, Agent, or Firm* — Sheppard Mullin Richter & Hampton LLP

(57) ABSTRACT

A system for computer vision is disclosed. The system may comprise a processor and a non-transitory computer-readable storage medium coupled to the processor. The non-transitory computer-readable storage medium may store instructions that, when executed by the processor, cause the system to perform a method. The method may comprise obtaining a first and a second images of at least a portion of an object, extracting a first and a second 2D contours of the portion of the object respectively from the first and second images, matching one or more first points on the first 2D contour with one or more second points on the second 2D contour to obtain a plurality of matched contour points and a plurality of mismatched contour points, and reconstructing a shape of the portion of the object based at least in part on at least a portion of the matched points and at least a portion of the mismatched contour points.

20 Claims, 7 Drawing Sheets

(56) References Cited

U.S. PATENT DOCUMENTS

| | | | | |
|---|---|---|---|---|
| 2008/0107345 A1* | 5/2008 | Melikian | ............ | G06K 9/00818 |
| | | | | 382/209 |
| 2013/0181983 A1* | 7/2013 | Kitamura | ............... | G01B 11/24 |
| | | | | 345/419 |
| 2015/0070346 A1* | 3/2015 | Wang | .................... | G06T 15/205 |
| | | | | 345/419 |
| 2015/0269723 A1* | 9/2015 | Karam | .................. | G06T 7/0004 |
| | | | | 348/46 |
| 2015/0371432 A1* | 12/2015 | Medioni | ................... | G06T 7/73 |
| | | | | 345/419 |
| 2016/0012312 A1* | 1/2016 | Ishii | .................... | G06K 9/6204 |
| | | | | 382/209 |

* cited by examiner

METHODS AND SYSTEMS FOR 3D CONTOUR RECOGNITION AND 3D MESH GENERATION

CROSS REFERENCE TO RELATED APPLICATIONS

This application is based on and claims the benefit of priority to U.S. Provisional Application No. 62/364,195, filed with the United States Patent and Trademark Office on Jul. 19, 2016, and entitled "METHODS AND SYSTEMS FOR 3D CONTOUR RECOGNITION AND 3D MESH GENERATION," which is hereby incorporated by reference in its entirety.

TECHNICAL FIELD

The present disclosure relates generally to methods and systems for computer vision, and more particularly, to methods and systems for 3D contour recognition and 3D mesh generation.

BACKGROUND 3D contour recognition and mesh generation is one of the most sought-after topics in 3D computer vision, which has a wide variety of applications in mapping, robotics, virtual reality, augmented reality, architecture, game, film making, and etc. A 3D contour recognition and mesh generation system can generate 3D representations or models (e.g., 3D meshes) from input images. The generated 3D representations can be stored as geometric data to provide bases for rendering artistic effects in various applications.

SUMMARY

One aspect of the present disclosure is directed to a system for computer vision. The system may comprise a processor and a non-transitory computer-readable storage medium coupled to the processor. The non-transitory computer-readable storage medium may store instructions that, when executed by the processor, cause the system to perform a method. The method may comprise obtaining a first and a second images of at least a portion of an object, extracting a first and a second 2D contours of the portion of the object respectively from the first and second images, matching one or more first points on the first 2D contour with one or more second points on the second 2D contour to obtain a plurality of matched contour points and a plurality of mismatched contour points, and reconstructing a shape of the portion of the object based at least in part on at least a portion of the matched points and at least a portion of the mismatched contour points.

Another aspect of the present disclosure is directed to a method for computer vision. The method may comprise obtaining a first and a second images of at least a portion of an object, extracting a first and a second 2D contours of the portion of the object respectively from the first and second images, matching one or more first points on the first 2D contour with one or more second points on the second 2D contour to obtain a plurality of matched contour points and a plurality of mismatched contour points, and reconstructing a shape of the portion of the object based at least in part on at least a portion of the matched points and at least a portion of the mismatched contour points.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several embodiments and, together with the description, serve to explain the disclosed principles.

DETAILED DESCRIPTION

Figure 1:
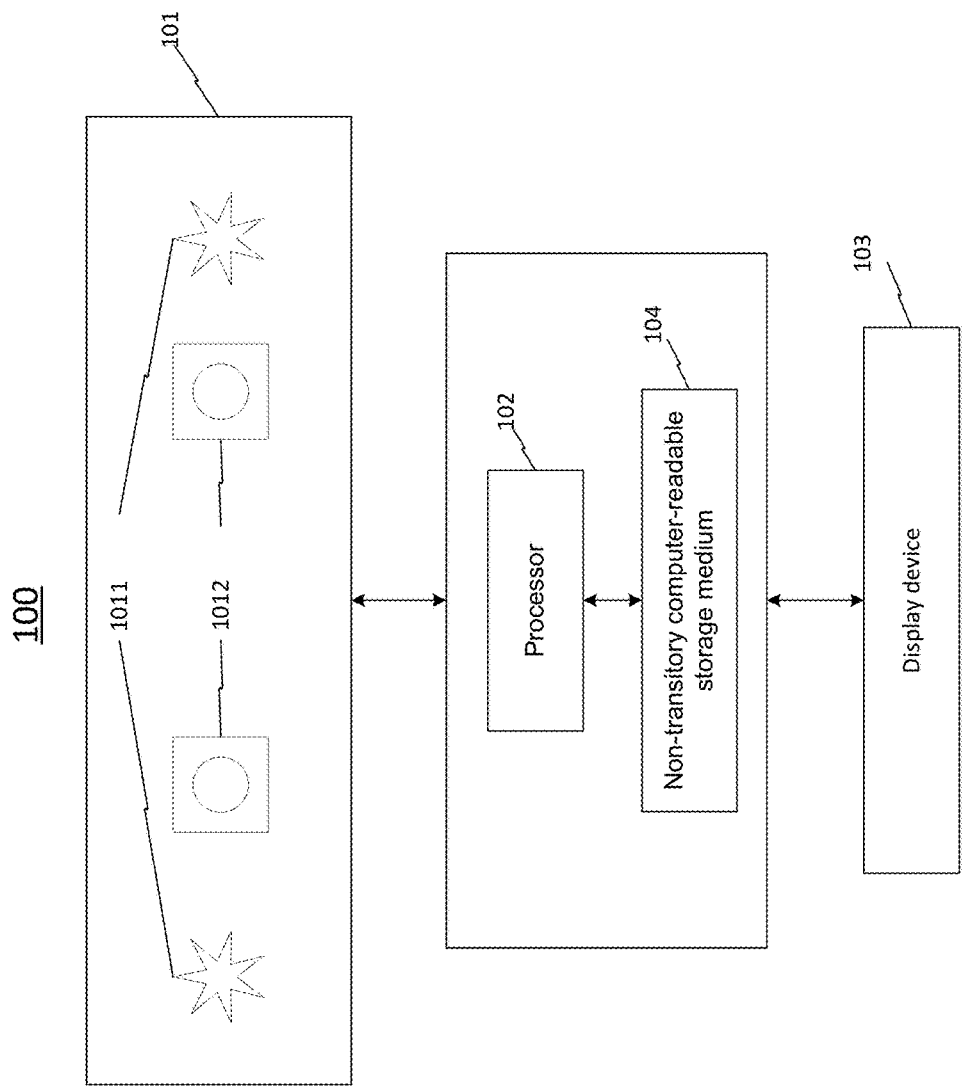
FIG. 1 is a block diagram illustrating a system for 3D contour recognition and 3D mesh generation, consistent with exemplary embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Under conventional approaches, 3D contour recognition and mesh generation can pose several challenges. With respect to current technologies, most 3D mesh generation systems acquire a stereo image pair of an object from two Infrared (IR) cameras, perform stereo image matching, calculate depths of the object based on the stereo image pair, and generate a corresponding 3D mesh of the object. However, the existing stereo image matching technologies are mostly slow and inaccurate. The fastest stereo image matching method processes a 320*240 image at a recognizing speed of just 15 fps on a PC. Moreover, since cross-section-based stereo image matching in existing technologies scans stereo images slice by slice, the method is prone to produce erroneous 3D representations, if any of the stereo images contains a self-occlusion or a partially missing contour. In one example of self-occlusion, when two cameras view a large segment of an object hiding behind a small segment of the object, the small segment may appear in front of the large segment and may partially block the view of the large segment. Thus, the cameras may inaccurately determine a depth value of the object, as being smaller than a real depth of the large segment and larger than a real depth of the small segment.

A claimed solution rooted in computer technology overcomes the problems specifically arising in the realm of computer vision. In various implementations, systems and methods for computer vision (e.g., object recognition and rendering) are disclosed. An exemplary system may comprise at least two cameras configured to capture a first image and a second image, a processor coupled to the cameras, and a non-transitory computer-readable storage medium coupled to the processor. The non-transitory computer-readable storage medium may store instructions that, when executed by the processor, cause the system to perform a method. The method may comprise obtaining a first and a second images of at least a portion of an object (e.g., via the cameras), extracting a first and a second 2D contours of the portion of the object respectively from the first and second images, matching one or more first points on the first 2D contour with one or more second points on the second 2D contour to obtain a plurality of matched contour points and a plurality of mismatched contour points, and reconstructing a shape of the portion of the object based at least in part on at least a portion of the matched points and at least a portion of the mismatched contour points. With the disclosed systems and methods, the recognizing speed can be largely improved over that of image based methods, since contours have much lower dimensions than images and consume less computing power. The stereo image matching method as disclosed can reach 60 fps or higher on a Mobile ARM CPU, which is generally 3 to 5 times slower than a PC, achieving a faster and more accurate result. Further, the self-occlusion problem can be resolved by processing the mismatched points as discussed in details below.

FIG. 1 is a block diagram illustrating a system 100 for 3D contour recognition and 3D mesh generation, consistent with exemplary embodiments of the present disclosure. The system may include an IR device 101, a processor 102, a display device 103, and a non-transitory computer-readable storage medium 104 coupled to one another, some of which may be optional, and some of which may be local, online, or cloud-based. System 100 may be an integral device or may be disposed on several connected devices (e.g., a computer, a server, a cellphone, etc.).

IR device 101 may comprise one or more IR sources, e.g., IR light emitting diodes 1011, and one or more cameras 1012. The cameras 1012 may be selected from one or more RGB (red-green-blue) cameras, one or more depth cameras, one or more IR cameras, or a combination thereof (e.g., RGB-IR cameras, RGB-depth cameras, etc.). The cameras 1012 may capture RGB information, IR information, and/or depth information of an object and transmit such information to processor 102. For example, the IR radiation emitted from an object, or received from the emitting diodes 1011 and reflected from an object, may be captured by the IR cameras. The RGB and depth information may have an image or video format. The non-transitory computer-readable storage medium may connect to processor 102. The non-transitory computer-readable storage medium 104 may store instructions that, when executed by processor 102, perform the method(s)/step(s) described below. An output of the performed method(s)/step(s) may be transmitted to display device 103 for rendering. In some embodiments, display device 103 may be a mobile device such as a cellphone. The processor 102, the non-transitory computer-readable storage medium 104, and/or the IR device 101 may be an integral part of the display device 103 or may be disposed in a separate device.

Figure 2:
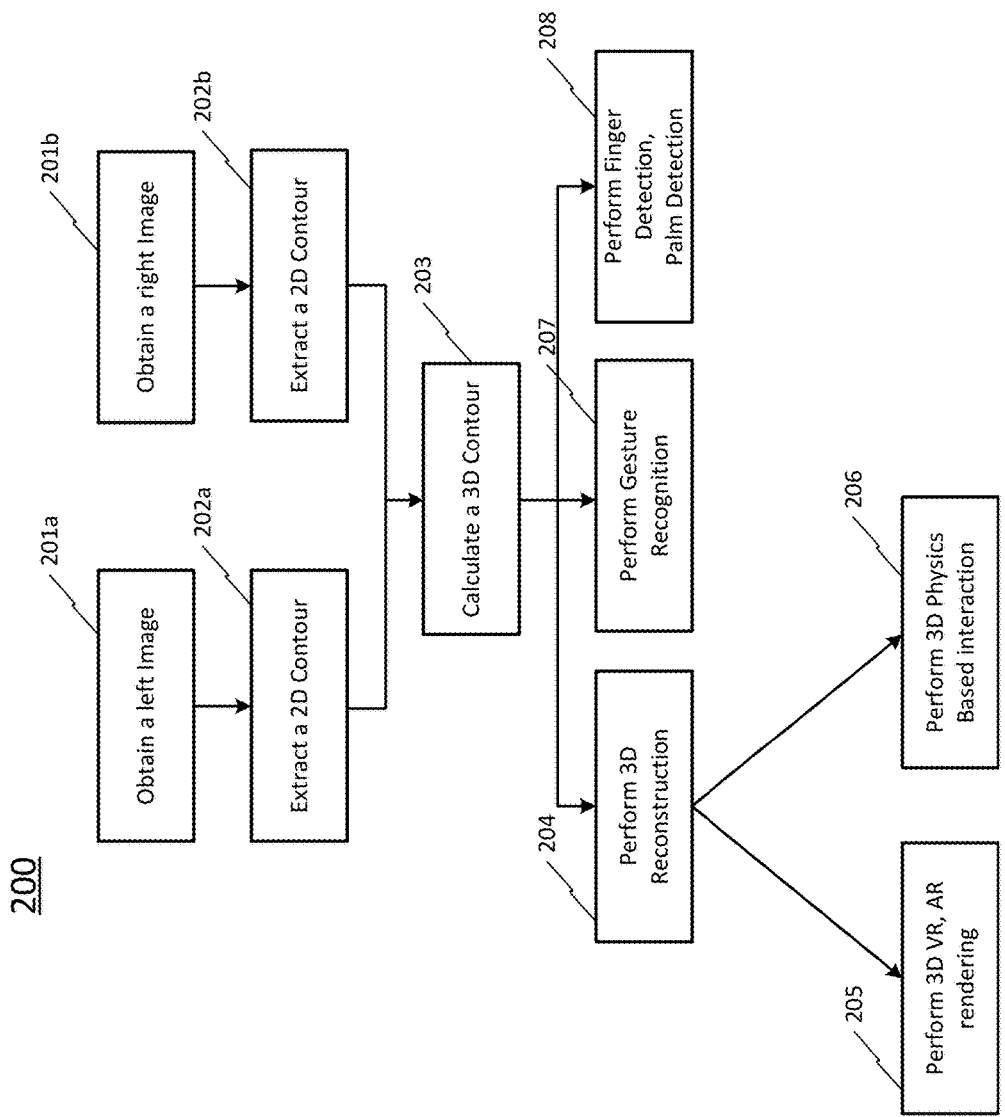
FIG. 2 is a flow diagram illustrating a high-level method for 3D contour recognition and 3D mesh generation, consistent with exemplary embodiments of the present disclosure.

FIG. 2 is a flow diagram illustrating a high-level method 200 for 3D contour recognition and 3D mesh generation, consistent with exemplary embodiments of the present disclosure. The method includes a number of steps, some of which may be optional. For example, steps 204-208 described below may be exemplary applications based on calculated 3D contours and, therefore, may be optional. Inputs of method 200 may include images of an object, e.g., stereo IR images of a hand, and correspondingly, outputs of method 200 may include a 3D contour and a 3D mesh of the hand.

At steps 201a and 201b, system 100 may obtain stereo images, e.g., a left image and a right image, of the object or a portion of the object. In some embodiments, a left camera of system 100 may obtain the left image, and a right camera of system 100 may obtain the right image. The images may be obtained simultaneously. The left and the right images may be referred to as a first and a second images.

At steps 202a and 202b, system 100 may obtain corresponding 2D contours of the object based on the obtained stereo images, e.g., contours of silhouettes of the obtained left and right images. In some embodiments, system 100 may obtain 2D contours of an object image by converting the object image to black-and-white and identifying borders separating black and white pixels as contours of the object. That is, a first and a second 2D contours of the portion of the object may be extracted respectively from the first and second images. The extraction may comprise converting the first and the second images to black-and-white 2D images, and extracting borders separating black and white pixels as the first and second 2D contours.

At step 203, system 100 may calculate a 3D contour of the object based on the obtained 2D contours. Step 203 may comprise matching one or more first points on the first 2D contour with one or more second points on the second 2D contour to obtain a plurality of matched contour points and a plurality of mismatched contour points. Step 203 may comprise a number of sub-steps, such as aligning geometric centers of the first and the second 2D contours, matching the first points and the second points having y coordinates within a predetermined threshold, matching the first points and the second points having local shapes within another predetermined threshold, and/or for each of the first points, matching a first point against a plurality of second points having y coordinates within a predetermined range from the first point's y coordinate. These sub-steps are described in details below with reference to FIGS. 3A, 3B, 4A, 4B, 5A-5H, 6A-6C, and 7.

In some embodiments, the obtained 2D contours may comprise 2D contour information of a hand captured by a left IR camera of system 100 (referred to as "a left contour" or "a first contour") and 2D contour information of the same hand captured by a right IR camera of system 100 (referred to as "a right contour" or a "second contour"). At step 203, system 100 may determine matching contour points between the left contour and the right contour by sequence matching subject to one or more constraints. The constraints may comprise, for example, matching contour points with corresponding y coordinates within a predetermined threshold after rectification, matching contour points with similar x-positions within a predetermined threshold, matching contour points with similar local shapes (e.g., local gradient), matching contour points based on a unified directional order (e.g., clockwise or counter-clockwise), and/or matching palm centers of the left and right contours.

In some embodiments, system 100 may quantize the match of the left and the right contours as matching the left and the right contour points, and further quantify the match as minimizing a "matching error" or maximizing a "matching score" between a left contour point i and a right point j (e.g., by matching each point in one contour with all points in the other contour), or between a predetermined number of neighboring points near point i and a predetermined number of points near point j. For example, a matching score d(i, j) can be expressed as a sum of a matching score of y coordinates $d_y(p_i, p_j)$ and a matching score of edge shape descriptors $d_e(p_i, p_j)$ as expressed in the formula below. $d_y(p_i, p_j)$ may described how well the contour points are matched in the y-coordinates, and $d_e(p_i, p_j)$ may described how well the contour points are matched in local shapes. Details of the y coordinate matching and edge shape matching are described in detail below with reference to FIGS. 3A, 3B, 4A, and 4B.

$$d(i,j)=d_y(p_i,p_j)+d_e(p_i,p_j)$$

The matching score may also include other constraints described above and associated weights. For example, the matching score can account for differences in x positions with a large negative weight, such that a larger difference in x positions will reflect as a larger decrease in the matching score.

Figure 3B:
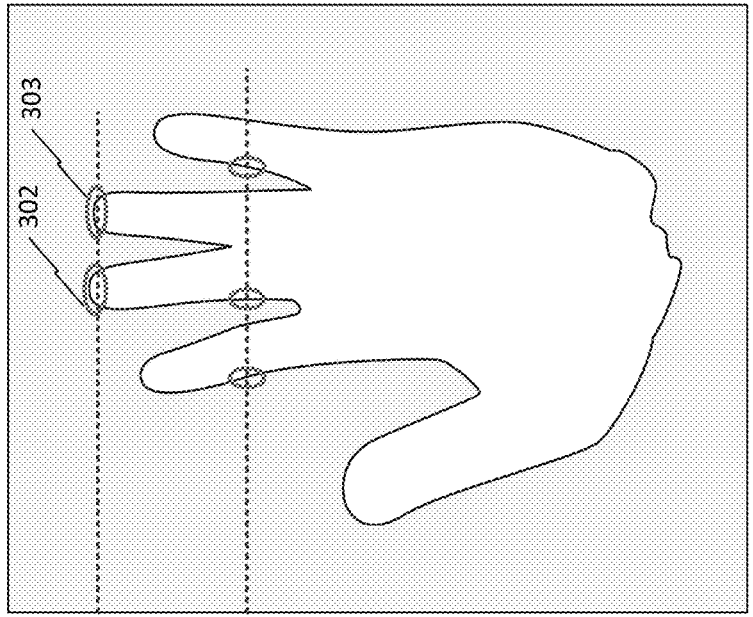
FIGS. 3A and 3B are graphical representations illustrating matching y coordinates of contour points, consistent with exemplary embodiments of the present disclosure.
Figure 3A:
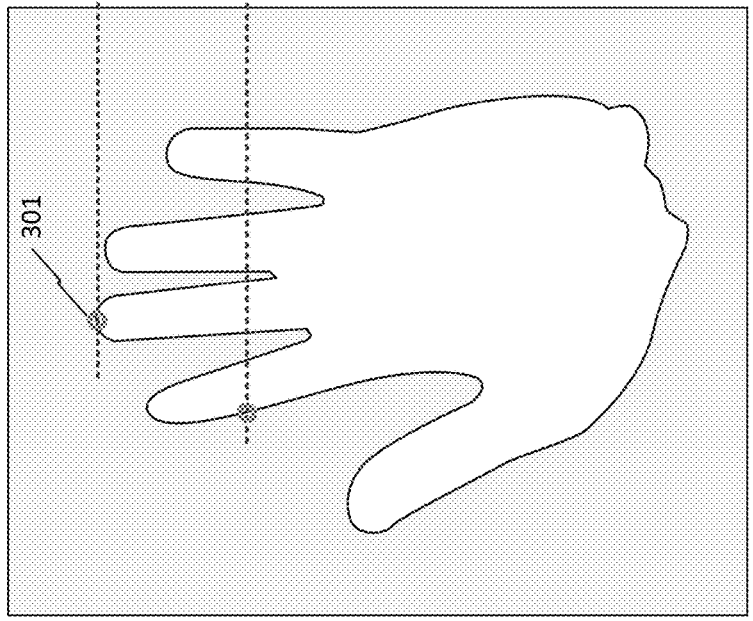

Referring to FIGS. 3A and 3B, in some embodiments, system 100 may match contour points on two stereo images based on respective y coordinates. FIG. 3A illustrates a left 2D contour of a hand, FIG. 3B illustrates a right 2D contour of the same hand, and the 2D contours have been rectified. The rectification may comprise aligning predetermined parameters of the 2D contours, such as the centers of mass or geometric centers of the two hand contours. Two dash lines spanning across the two figures indicate locations having similar y coordinates on respective contours. Each pair of contour points on respective contours and intersecting with the dash lines may be a matching candidate pair. For example, the circled contour point 301 in FIG. 3A may be matched with any of the circled contour points (e.g., contour points 302, 303, etc.) in FIG. 3B, provided that the matched circled points lie on the same dash line.

Figure 4A:
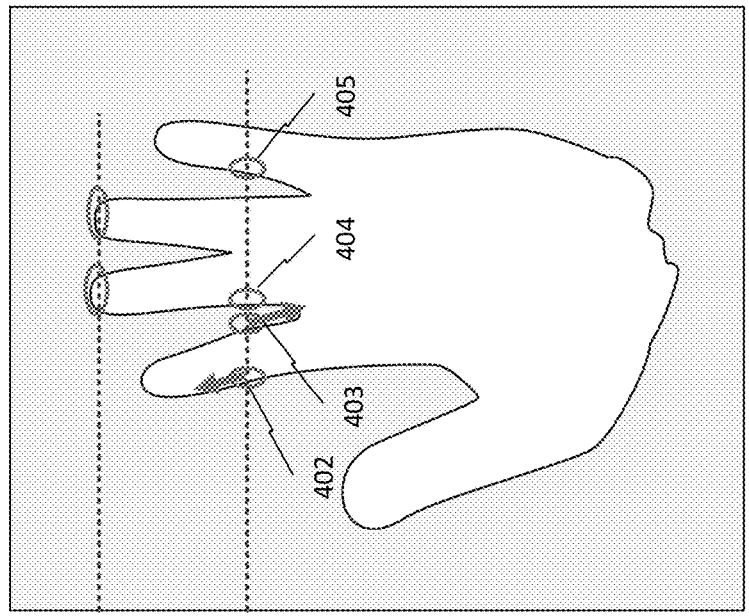
FIGS. 4A and 4B are graphical representations illustrating matching edge shapes of contour points, consistent with exemplary embodiments of the present disclosure.
Figure 4B:
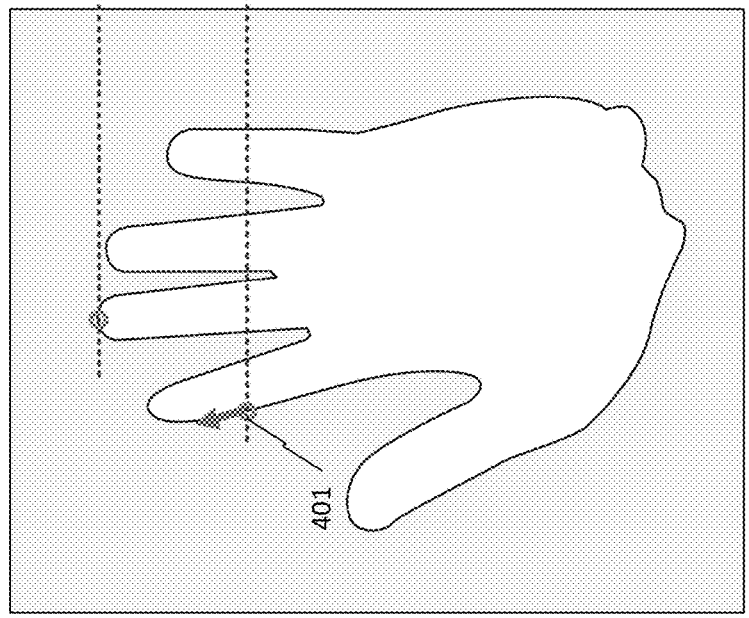

Referring to FIGS. 4A and 4B, in some embodiments, system 100 can further match candidate pairs based on edge shapes. Contours illustrated in FIGS. 4A and 4B are similar to those in FIGS. 3A and 3B. Based on the y coordinate matching described above with reference to FIGS. 3A and 3B, the contour point 401 in FIG. 4A and indicated by an upward arrow can be matched with several contour points in FIG. 4B, such as contour point 402 in FIG. 4B indicated by an upward arrow, contour point 403 in FIG. 4B indicated by an downward arrow, contour point 404 in FIG. 4B, contour point 405 in FIG. 4B, etc. Each arrow indicates a predetermined contour direction for calculating $d_e(p_i, p_j)$, e.g., clockwise along the contour as illustrated by the arrows in in FIGS. 4A and 4B. Each arrow can also describe the edge shapes of the corresponding part of the contour. Since the right side of the index finger in FIG. 4B has a different local contour direction from the left side of the index finger in FIG. 4A, system 100 may determine that the contour point 403 as indicated by the downward arrow does not match the contour point 401 in FIG. 4A and indicated by the upward arrow. Further, system 100 may determine the match based on a predetermined difference threshold in contour directions. For example, system 100 may calculate the gradient angle of each contour point (e.g., the contour gradient at each contour point) and may only match candidate contour points of less than a predetermined difference in gradient angle (e.g., 10 degrees).

Further, system 100 may use dynamic programming to obtain sub-sequence matching with the largest match score. As represented by the formula below and based on the matching score described above, system 100 may determine neighboring points of contour point i from one contour and neighboring points of contour point j from another contour. The neighboring points may be determined based on a predetermined range from the contour point i or j, e.g., from 1 to K as represented by k. Accordingly, system 100 may match the neighboring points of the contour points i and j to more accurately extract matching contour point pairs, thereby obtaining a more accurate match of the contours.

$$p(i, j) = \begin{cases} d(i, j), i = 1 \text{ or } j = 1 \\ \min\{p(i-k, j), p(i, j-k) \mid k = 1, \ldots, \kappa\} + d(i, j) \end{cases}$$

Figure 5D:
FIGS. 5A-5H are graphical representations illustrating matching contour points, consistent with exemplary embodiments of the present disclosure.
Figure 5H:
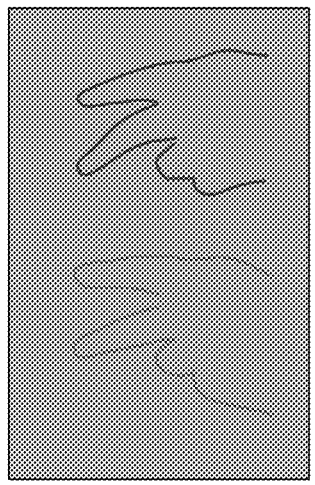
Figure 5C:
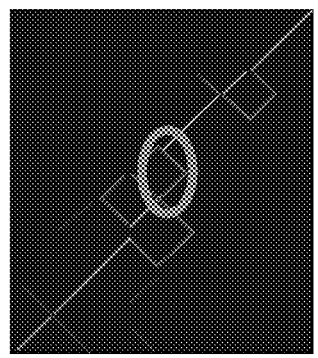
Figure 5G:
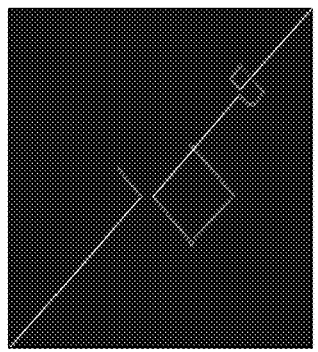
Figure 5B:
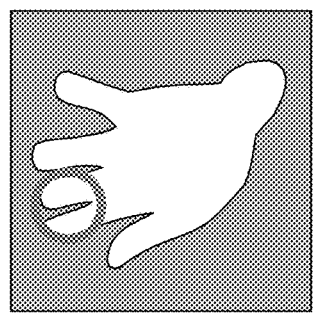
Figure 5F:
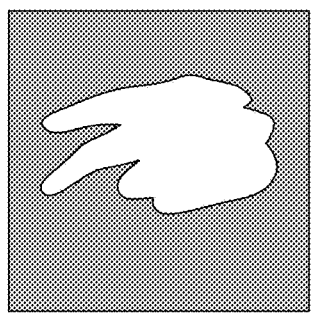
Figure 5A:
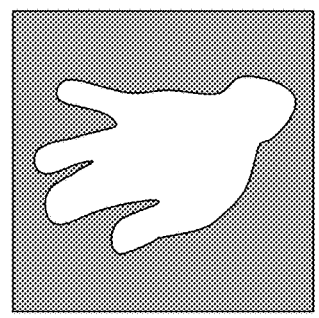
Figure 5E:
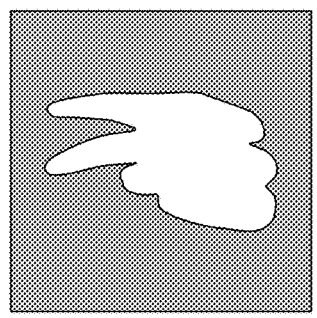

Referring to FIGS. 5A-5H, in some embodiments, system 100 may match all contour points of two stereo images and generate a match result. FIGS. 5A and 5B illustrate a pair of contours to be matched, corresponding to a path result shown in FIG. 5C and a match result of both hand images shown in FIG. 5D. FIGS. 5E and 5F illustrate another pair of contours, corresponding to a path result shown in FIG. 5G and a match result of both hand images shown in FIG. 5H. FIGS. 5A and 5B may illustrate contour images of one hand, and FIGS. 5E and 5F may illustrate contour images of another hand. To obtain FIGS. 5C and 5G, in some embodiments, system 100 may match each point in one contour (e.g., the hand contour in FIG. 5A) with all points in the other contour (e.g., the hand contour in FIG. 5B) and obtain a matching score for every match based on the matching score and/or the sub-sequence matching described above. System 100 may map all of the matching scores on a square matrix (e.g., FIG. 5C and FIG. 5G), with the y-axis corresponding to points along one contour and the x-axis corresponding to points along the other contour, so that any point in the matrix indicates a matching score of a contour point pair based on the two contours. System 100 may assign each matrix point a brightness to indicate a certain matching score level. For example, higher matching scores are assigned to a larger brightness to indicate a good match, whereas dark areas may indicate no good match. A continuous and bright line running from the top left corner to the bottom right corner of the square matrix may indicate a perfect match between two contours, indicating that every points on both contours are one-to-one matched. In contrast, dim points/lines may indicate matched pairs with a lower matching score, and disconnection between lines may indicate disparities between the contours. For example, the circled step in FIG. 5C corresponds to a mismatch between the contours in FIG. 5A and FIG. 5B. In FIG. 5A, it appears that the middle finger and the index finger are merged, whereas in FIG. 5B, the middle finger and the index finger are separated as indicated by a circled gap between them. Correspondingly, the contour of the hand on the right in FIG. 5D is disconnected between the middle finger and the index finger to account for the disparity, while the other solid points in FIG. 5D indicate matched contour points. As shown in FIG. 5D, system 100 can obtain reasonably matched contour points from the input contours of FIG. 5A and FIG. 5B, and identify locations of possible occlusions (e.g., the circled part in FIG. 5D). When constructing a 3D contour from the 2D contours, the mismatched portion may be separately calculated to reconstruct all five fingers, as described below with respect to FIG. 6.

FIGS. 5E-5H are similar to FIGS. 5A-5D with respect to contour processing and analysis. FIGS. 5G-5H illustrate mostly matched contour points from the contour images of FIGS. 5E and 5F. In FIG. 5G, an almost continuous and bright line runs across the matrix, indicating a good match between the contour points. In FIG. 5H, the match result shows two contours of a hand matched with each other.

With the disclosed method, the recognizing speed can be largely improved over that of image based methods, since contours have much lower dimensions than images and consume less computing power. The stereo image matching method as disclosed can reach 60 fps or higher on a Mobile ARM CPU, which is generally 3 to 5 times slower than a PC, achieving a faster and more accurate result.

Figure 6:
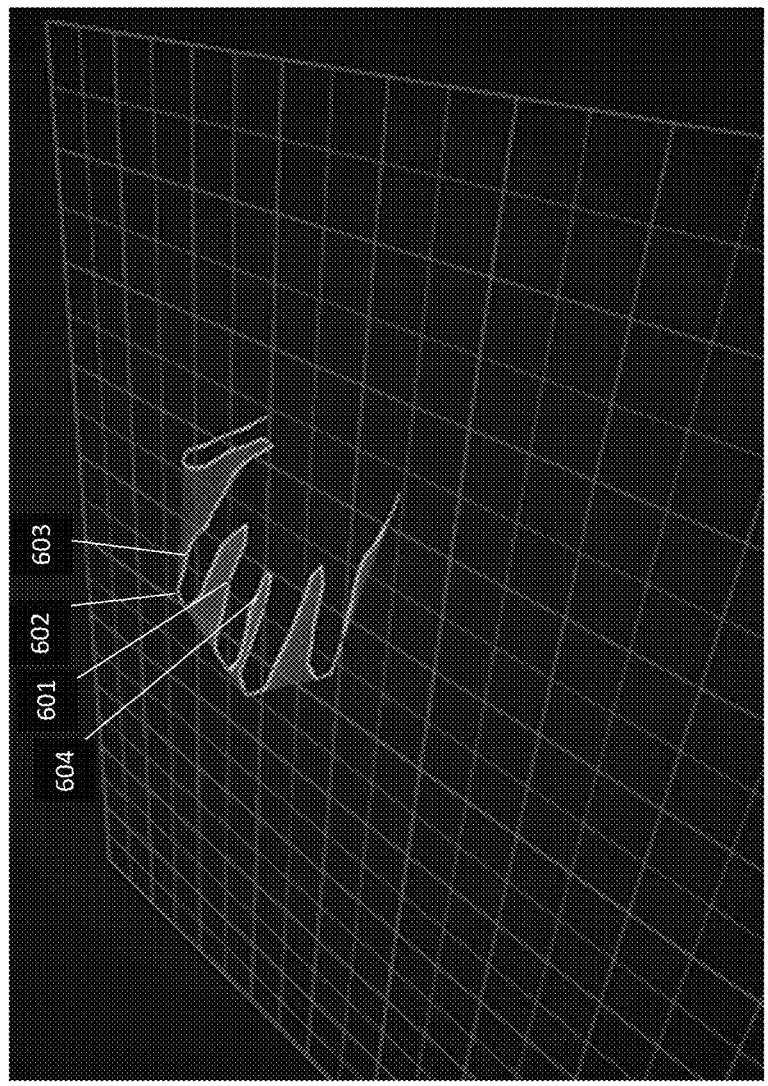
FIG. 6 is a graphical representations illustrating an obtained 3D contour, consistent with exemplary embodiments of the present disclosure.

Referring to FIG. 6, FIG. 6 illustrates a 3D contour obtained from 2D contours of the hand. For example, the shape of the portion of the object (e.g., the hand) may be reconstructed based at least in part on at least a portion of the matched points and at least a portion of the mismatched contour points described above. The reconstruction may comprise: obtaining, via 3D triangulation, one or more 3D points of the object corresponding to the matched points, based on at least a portion of the matched points and one or more physical parameters of the at least two cameras; obtaining one or more 3D points of the object corresponding to the mismatched points, based on at least a portion of the mismatched points of one of the first and the second images and depth information of at least a portion of 3D points of the object corresponding to the matched points; and combining the obtained 3D points corresponding to the matched points and the obtained 3D points corresponding to the mismatched points. These reconstruction steps are discussed below.

In some embodiments, based on the obtained matched contour points (e.g., the matched contours from FIG. 5D or 5H) as well as physical parameters of cameras in system 100 (e.g., wide angles, focal lengths, distances between the cameras, etc.), system 100 can determine 3D coordinates of matched contour points through geometric and optical calculations. For example, system 100 can obtain the 3D contour from the 2D contours by a 3D reconstruction method or a triangulation method. The 3D reconstruction or triangulation method may be simplified to determining a point in 3D space given its projections into two or more images in computer vision. In the scenario of the two cameras capturing an object described above, each point of the object may correspond to a line captured by the left camera in the left image and another line captured by the right camera in the right image. That is, the pair of points in the left and right images are the projection of a common 3D point. Conversely, the set of lines generated by pairs of images points can intersect at the common 3D point. To identify the common 3D point from an image point pair, a number of methods may be used. For example, provided that image point pairs are identified, for each camera, its focal point and an image point of the image point pair can determine a straight line in the 3D space. By projecting the two straight lines in 3D and based on relative positions of the two cameras, the intersection of the projected lines may be determined as the common 3D point relative to the cameras. In practice, various types of noise, such as geometric noise from lens distortion or interest point detection error may need to be taken account to accurately determine the common 3D point.

In some embodiments, for the mismatched portion of the contour described above with respect to FIG. 5D, direct 3D reconstruction or triangulation may not be performed due to the lack of complete pairs of matched points. Instead, for the mismatched portion of the object, system 100 may use 2D information from one of the mismatched images and calculate depth information based on 3D points reconstructed from the matched points. The 2D information and the depth information can be combined to obtain 3D points for the mismatched portion of the object. For example, system 100 may obtain 3D points corresponding to the matched contour portion of the object as described above (e.g., with the matched contour points from FIG. 5D) and reconstruct a partial 3D contour. System 100 may complete the partial 3D contour by obtaining 3D points of the mismatched contour portion of the object. System 100 may calculate the 3D points of the mismatched contour points based on 2D points corresponding to the mismatched portion from FIG. 5B (as circled in the figure), as well as the calculated depth(s) of the mismatched portion from FIG. 5B. As shown in the reconstructed 3D hand contour in FIG. 6, system 100 may calculate the depth(s) of the mismatched portion (e.g., points of portion 601 between the middle finger and the index finger, portion 601 corresponding to the circled portion in FIG. 5B and FIG. 5D) based on depths of points from the 3D contour points constructed based on the matched points, for example, by averaging depths of a predetermined number of neighboring points (e.g., points at portion 602) or scaling from depths on two closest finger edges (e.g., edge 603 and edge 604).

Figure 7:
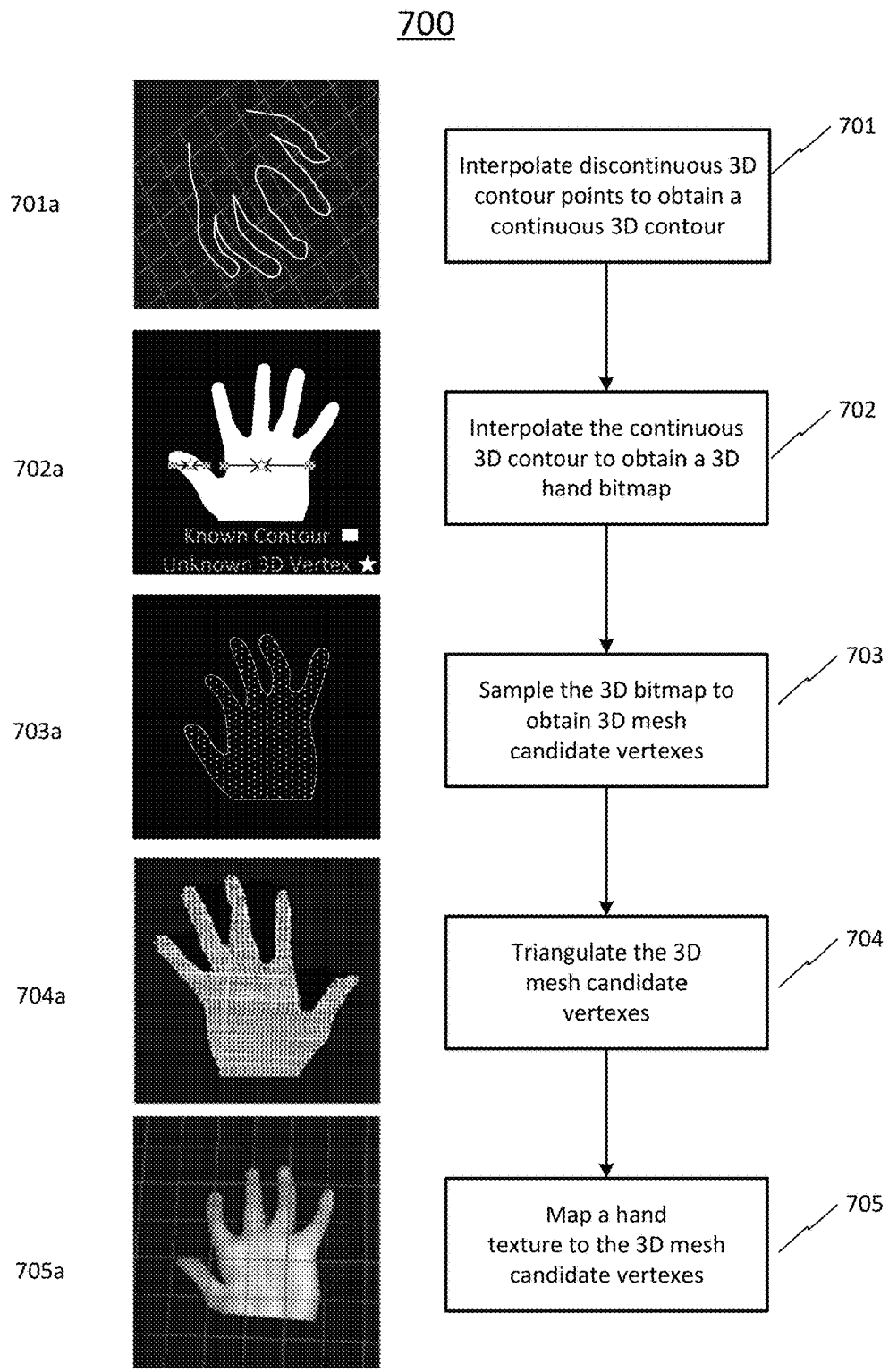
FIG. 7 is a flow diagram illustrating a 3D mesh generation method, consistent with exemplary embodiments of the present disclosure.

FIG. 7 is a flow diagram illustrating a 3D mesh generation method 700, consistent with exemplary embodiments of the present disclosure. Method 700 may comprise a number of steps, some of which may be optional or rearranged in another order. Each step is accompanied with a graphical illustration of the associated effect, e.g., step 701 is accompanied by illustration 701a, using the hand as an example.

At step 701, system 100 may interpolate discontinuous 3D contour points (e.g., discontinuous 3D contour points of the reconstructed shape from FIG. 6) to obtain a continuous 3D contour of the object (e.g., the hand), as described above with respect to FIGS. 5A-5D and 6. In some embodiments, the obtained 3D contour comprises points along edges of a hand laid flat, but does not comprise points on the palm area, or the back of the hand.

At step 702, system 100 may interpolate the obtained continuous 3D contour to obtain a 3D bitmap. In some embodiments, system 100 can scan the contour (e.g., line by line) and determine points within the contour as unknown 3D vertexes. Each unknown 3D vertex may be associated with two closest contour points on the same horizontal line and located left and right to the vertex (e.g., the two arrows pointing towards the point in the palm, the two arrows pointing towards the point in the thumb). System 100 may geometrically calculate coordinates of a unknown 3D vertex to obtain a 3D mesh candidate vertex. The calculation may be based on coordinates of the two closest contour points on the same line and the distances from these contour points to the 3D vertex. For example, for a palm center point, its depth may be averaged from the two closet contour points, and a corresponding point at the back of the palm may deeper from the palm center point by a predetermined amount. Thus, system 100 may obtain a 3D bitmap within the continuous 3D contour based on 3D coordinates of two closest points on the 3D contour.

At step 703, system 100 may sample the obtained 3D bitmap at a predetermined density to obtain 3D mesh candidate vertexes. In some embodiments, system 100 may perform step 702 to a predetermined number of points within the 3D contour to obtain a cloud of respective 3D coordinates. The predetermined number of points can be uniformly distributed within the 3D contour. System 100 may only select one point in every certain number of pixels as the predetermined number of points. In illustration 703a, a uniform density of points within the hand contour are determined as the 3D mesh candidate vertexes. The 3D mesh candidate vertexes may be determined for both the palm surface and the back surface of the palm.

At step 704, system 100 may triangulate the obtained 3D mesh candidate vertexes. In some embodiments, system 100 may determine sets of three vertexes for the obtained 3D mesh candidate vertexes, populate a triangle based on each set of vertexes, and repeat the triangulation process to all obtained 3D mesh candidate vertexes. By this step, system 100 may obtain a 3D mesh (e.g., polygon mesh) structure of the object, so that the surface of the object is covered and described by connected small triangles.

At step 705, system 100 may map a texture to the triangulated 3D mesh candidate vertexes. With the addition of the texture to the mesh structure, system 100 may obtain a realistically modelled 3D object. The model can be used in many applications such as those described below.

Referring back to FIG. 2, at step 204, system 100 may perform 3D reconstruction of the object. The 3D reconstruction may be rendered in a form of a 3D point cloud, a 3D mesh, or a depth map.

At step 205, system 100 may perform 3D virtual reality and/or augmented reality rendering of the reconstructed object. Based on the depth information carried in the 3D construction, system 100 can calculate relative positions between the object (e.g., the hand) and real physical objects in a virtual reality and/or augmented reality rendering, and accurately render the scenes. For example, system 100 may correctly detect and render positional relations for a hand partially or entirely hid behind a real physical objects or vice versa. Thus, user experiences can be enhanced in applications that require such detection or rendering.

At step 206, system 100 may perform 3D physics-based rendering of the reconstructed object. For example, system 100 may render the object with different colors depending on a distance between the rendered objected and a real physical object. For another example, users can directly control generated 3D contours or 3D meshes (e.g., as the user's hand is captured and its contour or mesh is rendered in real time) to interact with other 3D objects and observe physics-based simulations as if the generated 3D objects were real. The physical parameters (e.g., position, motion) of the 3D objects are determined in real time based on the physical parameters (e.g., position, motion) of the hand.

At step 207, system 100 may perform gesture recognition. Generated 3D contours and meshes can be passed to other algorithms such as a gesture recognition module for another application. For example, system 100 may determine a gesture of a hand, and execute an associated command.

At step 208, system 100 may perform finger or palm detection. For example, the object rendered by system 100 is a hand, and system 100 can further determine a finger or a palm from the rendered hand.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for 3D contour recognition and 3D mesh generation. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A system for computer vision, comprising:
    a processor; and
    a non-transitory computer-readable storage medium coupled to the processor and storing instructions that, when executed by the processor, cause the system to perform:
    obtaining a first and a second images of at least a portion of an object;
    extracting a first and a second 2D contours of the portion of the object respectively from the first and second images;
    matching one or more first points on the first 2D contour with one or more second points on the second 2D contour to obtain a plurality of matched contour points and a plurality of mismatched contour points; and
    reconstructing a shape of the portion of the object based at least in part on at least a portion of the matched points and at least a portion of the mismatched contour points;
    interpolating discontinuous 3D contour points of the reconstructed shape to obtain a continuous 3D contour;
    obtaining a 3D bitmap within the continuous 3D contour based on 3D coordinates of two closest points on the 3D contour; and
    sampling the 3D bitmap at a predetermined density to obtain 3D mesh candidate vertexes.

2. The system of claim 1, further comprising at least two cameras coupled to the processor, wherein:
    obtaining the first and the second images comprises the at least two cameras respectively capturing the first and second images; and
    the first and second images each comprise RGB (red-green-blue) information and depth information of the portion of the object.

3. The system of claim 1, wherein extracting the first and the second 2D contours of the portion of the object respectively from the first and second images comprises:
converting the first and the second images to black-and-white 2D images;
extracting borders separating black and white pixels as the first and second 2D contours.

4. The system of claim 1, wherein matching the one or more first points on the first 2D contour with the one or more second points on the second 2D contour to obtain the plurality of matched contour points and the plurality of mismatched contour points comprises aligning geometric centers of the first and the second 2D contours.

5. The system of claim 4, wherein matching the one or more first points on the first 2D contour with the one or more second points on the second 2D contour to obtain the plurality of matched contour points and the plurality of mismatched contour points further comprises at least one of:
matching the first points and the second points having y coordinates within a predetermined threshold; and
matching the first points and the second points having local shapes within another predetermined threshold.

6. The system of claim 5, wherein the local shapes comprise gradients of the contours at the corresponding points.

7. The system of claim 4, wherein matching the one or more first points on the first 2D contour with the one or more second points on the second 2D contour to obtain the plurality of matched contour points and the plurality of mismatched contour points further comprises:
for each of the first points, matching a first point against a plurality of second points having y coordinates within a predetermined range from the first point's y coordinate.

8. The system of claim 1, comprising: at least two cameras coupled to the processor and configured to respectively capture the obtained first and second images, wherein reconstructing the shape of the portion of the object based at least in part on at least a portion of the matched points and at least a portion of the mismatched contour points comprises:
obtaining, via 3D triangulation, one or more 3D points of the object corresponding to the matched points, based on at least a portion of the matched points and one or more physical parameters of the at least two cameras;
obtaining one or more 3D points of the object corresponding to the mismatched points, based on at least a portion of the mismatched points of one of the first and the second images and depth information of at least a portion of 3D points of the object corresponding to the matched points; and
combining the obtained 3D points corresponding to the matched points and the obtained 3D points corresponding to the mismatched points.

9. The system of claim 8, wherein the physical parameters of the cameras include at least one of wide angle, focal length, and distance between the cameras.

10. The system of claim 1, wherein the instructions, when executed by the processor, further causes the system to perform:
triangulating the 3D mesh candidate vertexes; and
mapping a texture to the 3D mesh candidate vertexes.

11. A method for computer vision, comprising:
obtaining a first and a second images of at least a portion of an object;
extracting a first and a second 2D contours of the portion of the object respectively from the first and second images;
matching one or more first points on the first 2D contour with one or more second points on the second 2D contour to obtain a plurality of matched contour points and a plurality of mismatched contour points; and
reconstructing a shape of the portion of the object based at least in part on at least a portion of the matched points and at least a portion of the mismatched contour points;
interpolating discontinuous 3D contour points of the reconstructed shape to obtain a continuous 3D contour;
obtaining a 3D bitmap within the continuous 3D contour based on 3D coordinates of two closest points on the 3D contour;
sampling the 3D bitmap at a predetermined density to obtain 3D mesh candidate vertexes.

12. The method of claim 11, wherein:
the first and the second images are obtained by at least two cameras respectively; and
the first and second images each comprise RGB (red-green-blue) information and depth information of the portion of the object.

13. The method of claim 11, wherein extracting the first and the second 2D contours of the portion of the object respectively from the first and second images comprises:
converting the first and the second images to black-and-white 2D images;
extracting borders separating black and white pixels as the first and second 2D contours.

14. The method of claim 11, wherein matching the one or more first points on the first 2D contour with the one or more second points on the second 2D contour to obtain the plurality of matched contour points and the plurality of mismatched contour points comprises aligning geometric centers of the first and the second 2D contours.

15. The method of claim 14, wherein matching the one or more first points on the first 2D contour with the one or more second points on the second 2D contour to obtain the plurality of matched contour points and the plurality of mismatched contour points further comprises at least one of:
matching the first points and the second points having y coordinates within a predetermined threshold; and
matching the first points and the second points having local shapes within another predetermined threshold.

16. The method of claim 15, wherein the local shapes comprise gradients of the contours at the corresponding points.

17. The method of claim 14, wherein matching the one or more first points on the first 2D contour with the one or more second points on the second 2D contour to obtain the plurality of matched contour points and the plurality of mismatched contour points further comprises:
for each of the first points, matching a first point against a plurality of second points having y coordinates within a predetermined range from the first point's y coordinate.

18. The method of claim 11, wherein reconstructing the shape of the portion of the object based at least in part on at least a portion of the matched points and at least a portion of the mismatched contour points comprises:
obtaining, via 3D triangulation, one or more 3D points of the object corresponding to the matched points, based on at least a portion of the matched points and one or more physical parameters of at least two cameras, the at least two cameras respectively capturing the first and the second images;
obtaining one or more 3D points of the object corresponding to the mismatched points, based on at least a portion of the mismatched points of one of the first and the second images and depth information of at least a portion of 3D points of the object corresponding to the matched points; and combining the obtained 3D points corresponding to the matched points and the obtained 3D points corresponding to the mismatched points.

19. The method of claim 18, wherein the physical parameters of the cameras include at least one of wide angle, focal length, and distance between the cameras.

20. The method of claim 11, further comprising:
triangulating the 3D mesh candidate vertexes; and
mapping a texture to the 3D mesh candidate vertexes.

* * * * *